US008972041B2

(12) United States Patent
Hancock et al.

(10) Patent No.: US 8,972,041 B2
(45) Date of Patent: Mar. 3, 2015

(54) PACKAGE DELIVERY KIOSK INCLUDING INTEGRATED ROBOTIC PACKAGE LIFTING ASSEMBLY WITH SHELVING SYSTEM

(75) Inventors: Stephen H. Hancock, Wake Forest, NC (US); Norman B. Desrosiers, Oxford, NC (US); Eric Fiest, Raleigh, NC (US); John Rupert, Raleigh, NC (US)

(73) Assignee: Flextronics AP, LLC, Broomfield, CO (US)

( * ) Notice: Subject to any disclaimer, the term of this patent is extended or adjusted under 35 U.S.C. 154(b) by 389 days.

(21) Appl. No.: 13/563,410

(22) Filed: Jul. 31, 2012

(65) Prior Publication Data

US 2014/0037404 A1 Feb. 6, 2014

(51) Int. Cl.
*G06F 7/00* (2006.01)

(52) U.S. Cl.
USPC ........... 700/214; 700/213; 700/215; 700/216; 700/231

(58) Field of Classification Search
None
See application file for complete search history.

(56) References Cited

U.S. PATENT DOCUMENTS

| | | | | |
|---|---|---|---|---|
| 3,750,804 A * | 8/1973 | Lemelson | ..................... | 414/276 |
| 2003/0185656 A1* | 10/2003 | Hansl | ............................ | 414/277 |
| 2005/0189364 A1* | 9/2005 | Herzog et al. | .................... | 221/1 |

OTHER PUBLICATIONS

International Search Report and Written Opinion for PCT/US2013/052954, dated Oct. 24, 2013, 9 pp.

* cited by examiner

*Primary Examiner* — Yolanda Cumbess
(74) *Attorney, Agent, or Firm* — Volpe and Koenig, P.C.

(57) ABSTRACT

Described herein is a package delivery kiosk (PDK) including an integrated robotic package lifting assembly and shelving system. The system includes a PDK, associated front end and back end package delivery management systems, including portals for the consumer, retailer, common carrier, sender, and recipient, a package inventory management system, integrated retailer access, and a real and automated retailer bidding system. The shelving system has shelves with receiving apertures and dividers configured to fit into the receiving apertures, where the dividers each have a receiving slot. A package retrieving apparatus includes a base, a vertical support interconnected with the base, and a package picker module. The package picker module is oriented to move up and down on the vertical support. The package picker module includes grippers configured to surround and grip the object. A kiosk includes a kiosk body having a package delivery slot and an interface slot.

20 Claims, 19 Drawing Sheets

PACKAGE DELIVERY KIOSK INCLUDING INTEGRATED ROBOTIC PACKAGE LIFTING ASSEMBLY WITH SHELVING SYSTEM

CROSS REFERENCE TO RELATED APPLICATIONS

This application is related to co-pending application Ser. No. 13/563,158 entitled "ROBOTIC PACKAGE LIFTING ASSEMBLY AND METHOD", filed concurrently herewith; co-pending application Ser. No. 13/563,255 entitled "SHELVING AND KIOSK SYSTEM", filed concurrently herewith; co-pending application Ser. No. 13/563,317 entitled "AUTOMATIC PACKAGE DELIVERY AND RETRIEVAL SYSTEM", filed concurrently herewith; and co-pending application Ser. No. 13/563,361 entitled "ON DEMAND KIOSK COMMERCE SYSTEM AND METHOD", filed concurrently herewith, the contents of which are hereby incorporated by reference herein.

BACKGROUND

The cost associated with operating a physical store front or delivering packages via mail or other package delivery common carriers is a significant expense of doing business. The last mile of delivery of packages is many times a large percentage of the expense of delivery, especially as compared to the total distance a package travels. In some cases, individuals living in apartment type dwellings can only receive packages if they are there to physically sign for them. Considering the hours of delivery and the hours most people work, home delivery is therefore impossible. In this case the resident must go to a post office or other depot during business hours. This provides for similar difficulty.

Increasingly consumers desire immediate satisfaction of orders and purchases. In order to do so they request express shipping, (at some cost), or go to a physical store front. When going to a physical store front, the consumer may not feel as though they are getting the best prices so they may be reluctant to purchase. Consumers may return home and search on Internet shopping sites in order to obtain the best price. Also, the store may not be open or may be far away. In such cases, they delay acquisition of the item of interest.

Therefore the ability to retrieve packages in an automated fashion at remote sites accessible to the public is desirable. One aspect of providing packages to users is providing an integrated storage and retrieval system.

BRIEF SUMMARY

Described herein is a package delivery kiosk (PDK) including an integrated robotic package lifting assembly with shelving system and method. Described herein is a package delivery kiosk (PDK) including an integrated robotic package lifting assembly and shelving system. The system may include a PDK, associated front end and back end package delivery management systems, including portals for the consumer and the retailer and, in an alternative, portals for the common carrier, sender, and recipient, a package inventory management system, integrated retailer access, and real and automated retailer bidding system, a robotic distribution apparatus is needed. A kiosk includes a package delivery slot, an interface slot and a shelving system with shelves having receiving apertures. The dividers fit into the receiving apertures and each have a receiving slot. A package retrieving apparatus includes a base, a vertical support interconnected with the base, and a package picker module. The package picker module is oriented on the vertical support such that the package picker module may move up and down. The package picker module includes grippers configured to surround and grip the object.

BRIEF DESCRIPTION OF THE FIGURES

A more detailed understanding may be had from the following description, given by way of example in conjunction with the accompanying drawings wherein.

DETAILED DESCRIPTION

Figure 1:
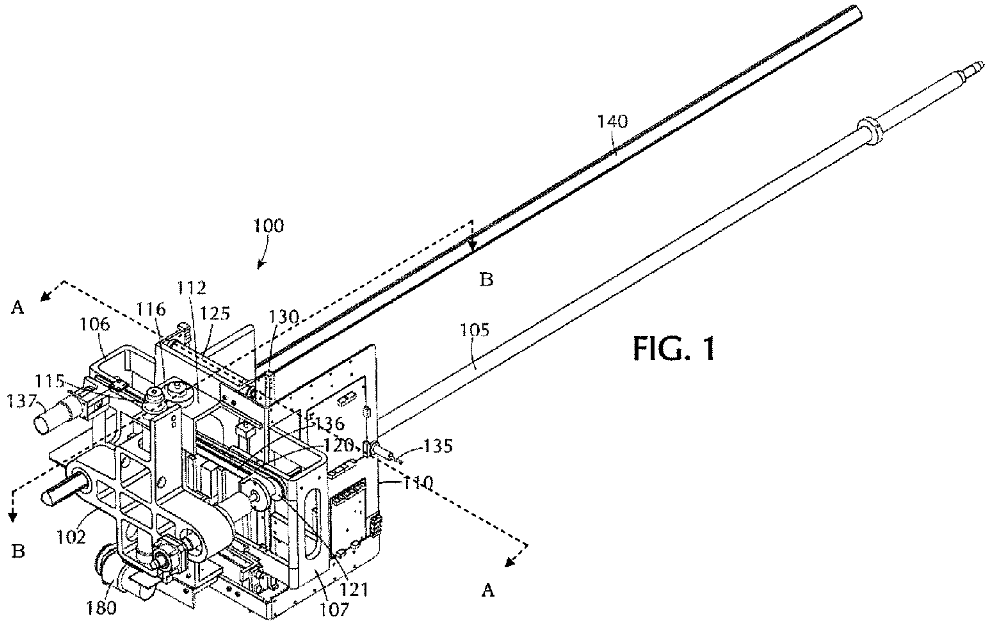
FIG. 1 shows a perspective view of one embodiment of a lifting portions of a Robotic Package Lifting Assembly (RPLA) which is part of the PDK.

Certain terminology is used herein for convenience only and is not to be taken as a limitation on the embodiments of a Package Delivery Kiosk (PDK) and integrated Robotic Package Lifting Assembly (RPLA). In the drawings, the same reference letters are employed for designating the same elements throughout the several figures.

The words "right", "left", "front", and "back" designate directions in the drawings to which reference is made. The words "inwardly" and "outwardly" refer to directions toward and away from, respectively, the geometric center of the case with flexible body portion and designated parts thereof. The terminology includes the words above specifically mentioned, derivatives thereof, and words of similar import. The drawings are proportional.

Like reference numerals designate like or corresponding parts throughout the various views and with particular reference to each of Figs. as delineated below.

Figure 1A:
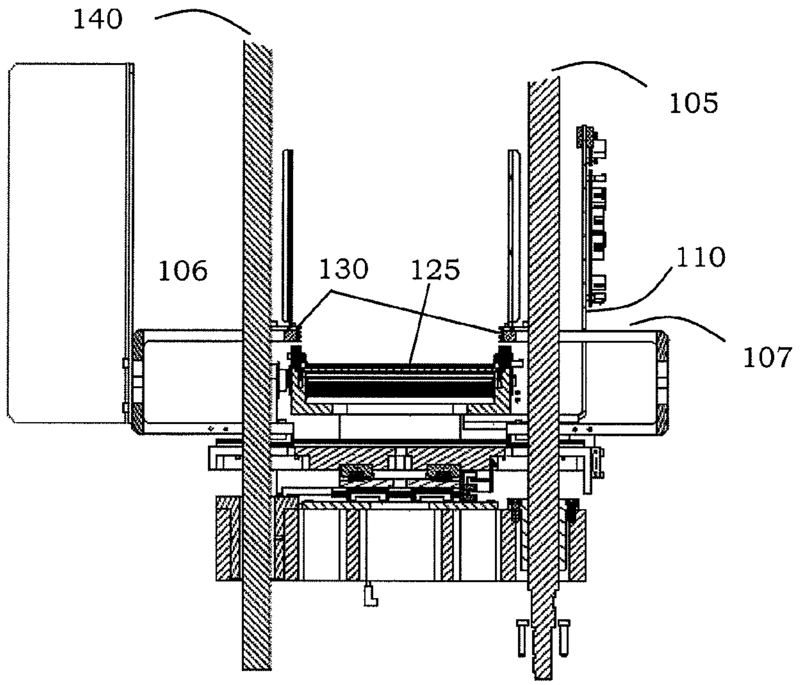
FIG. 1A shows a cross-sectional view of the embodiment of FIG. 1 taken along line A-A.
Figure 1B:
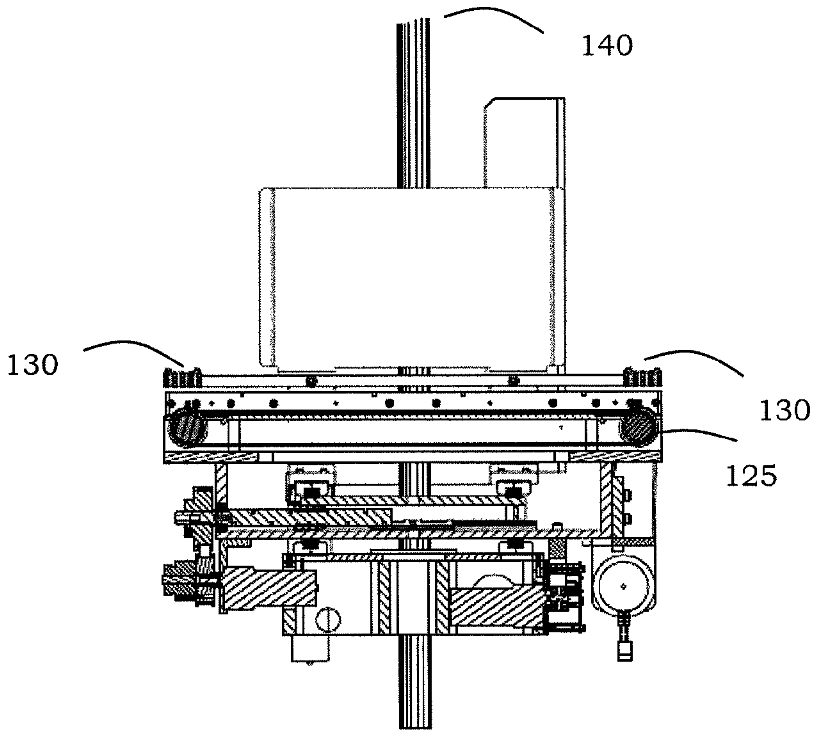
FIG. 1B shows a cross-sectional view of the embodiment of FIG. 1 taken along line B-B.

FIG. 1 shows a perspective view of one embodiment of the Robotic Package Lifting Assembly (RPLA) 100. FIG. 1A shows a cross-sectional view taken along line A-A and FIG. 1B shows a cross-sectional view taken along line B-B. RPLA

100 includes a robotic support bracket 102, which includes a plurality of attachment points. Lead screw shaft 105 passes through robotic support bracket 102 and provides for driving force to raise and lower RPLA 100 along lead screw shaft 105. This provides for Z-axis movement. The RPLA 100 further includes a first gripper side mount 106 and second gripper side mount 107. A circuit board assembly 110 includes the microprocessor components for receiving signals from a main control center and storing information concerning position. This may also be referred to as a control system and may include other circuitry or computers interconnected with the RPLA 100.

Underneath robotic support bracket 102 is lift platform plate 112 providing support to the platform that lifts the packages to be retrieved. Gripper pulley 116 is interconnected to clutch 115 and together provide driving control for a pair of grippers or gripper bars 130. The grippers 130 are configured such that they move in unison together to grip an object evenly from both sides. This ensures that the package or object will be gripped and closed on evenly from both sides. Gripper cross side 136 provides a side for the gripping function to keep grippers 130 square/perpendicular. Grabber belt 120 on grabber pulleys 121 ensure that the advancement and retraction of the gripper bars 130 is unified. This is due to the pulley connection to the bracket that the gripper bars 130 may be bolted to. This also limits the number of independent motors needed. The gripper bars 130 are configured to grip and pull an object a short distance onto conveyer belt 125. Conveyer belt 125 provides for the centering of the package on the RPLA 100. Belt motor 180 powers the conveyer belt 125. Encoders may be attached or coupled to the pulleys 121 to determine position and/or location.

Photo beam sensors (not shown) are provided to indicate the position or location of the box and may help position the box in the center of the conveyer belt resting area. For example, the photo beam sensors may be located on the ends of the gripper bars 130. This would indicate when the box has entered the conveyer belt resting area and when the conveyer belt has pulled the box onto the robot. It also allows the robot to re-position the box when the box crosses the back photo beam sensor towards the center of the conveyer belt resting area. In some embodiments this is needed since the conveyer belt 125 may not evenly grab every package. For example, in another embodiment, one of the gripper bars may be stationary and the other gripper bar may move. In this instance, the moving gripper bar would move the package onto the conveyer belt 125, which together would center the package on the conveyer belt 125. A proximity sensor 135 is provided to place a ceiling on vertical displacement of the robot.

Figure 2:
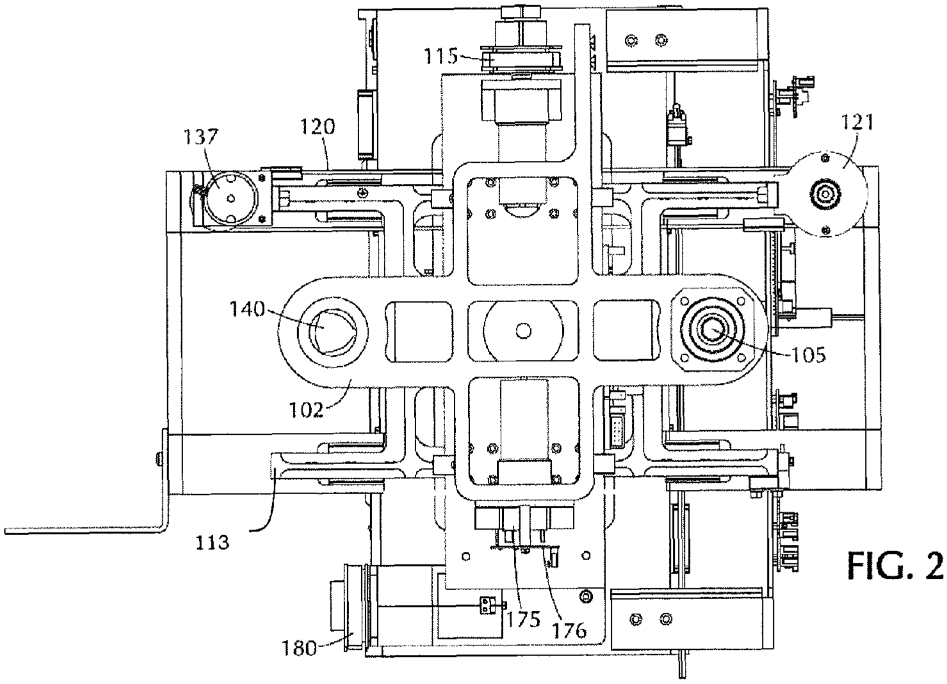
FIG. 2 show a bottom view of the RPLA of FIG. 1.

FIG. 2 shows a bottom view of the RPLA 100. Visible here are the alignment of lead screw shaft 105 and accompanying vertical support 140 in robotic support bracket 102. The screw shaft 105 includes a screw pattern that is not visible in FIG. 2. As the screw shaft 105 is turned it will power the RPLA 100 in the Z-axis direction. A motor 137 for driving grabber belt 120 is visible. The motor 137 is attached to "H" shaped bracket 113. Float motor Cam 175 and float motor sensor 176 are visible in this view and provide sensing for the movement of the gripper bars 130. That is, the float motor Cam 175 and float motor sensor 176 assist in centering the box in the conveyer belt resting area or "float" area. Belt motor 180 powers the conveyer belt 125.

Figure 3:
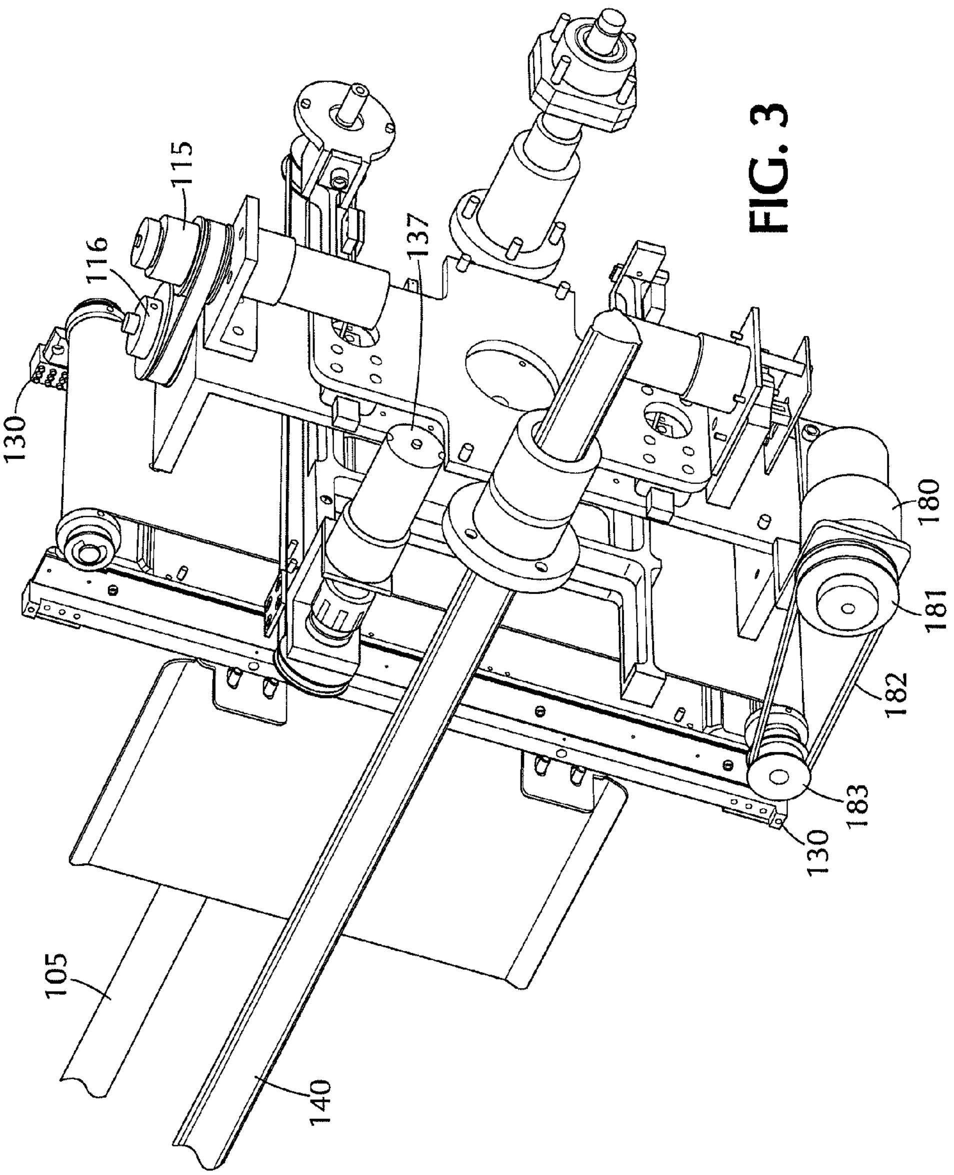
FIG. 3 shows of cut away view of the RPLA of FIG. 1.

FIG. 3 shows an additional view of RPLA 100. More of the coverings and elements have been cut away to reveal more workings of RPLA 100. Motor 137 drives gripper bars 130 to extend past the conveyer belt 125 to initiate grabbing. This drives the gripper bars 130 in either the positive or negative Y-axis direction and works in concert with the gripper system of the RPLA 100. The gripper system may include first gripper side mount 106 and second gripper side mount 107, gripper bars 130 and bracket 113. Belt motor 180 drives belt pulley 181, which in turn drives belt 182, which further in turn drives belt pulley 183, which is integrated into the conveyer belt roller of conveyer 125. This causes the conveyer belt 125 to be driven.

Figure 4:
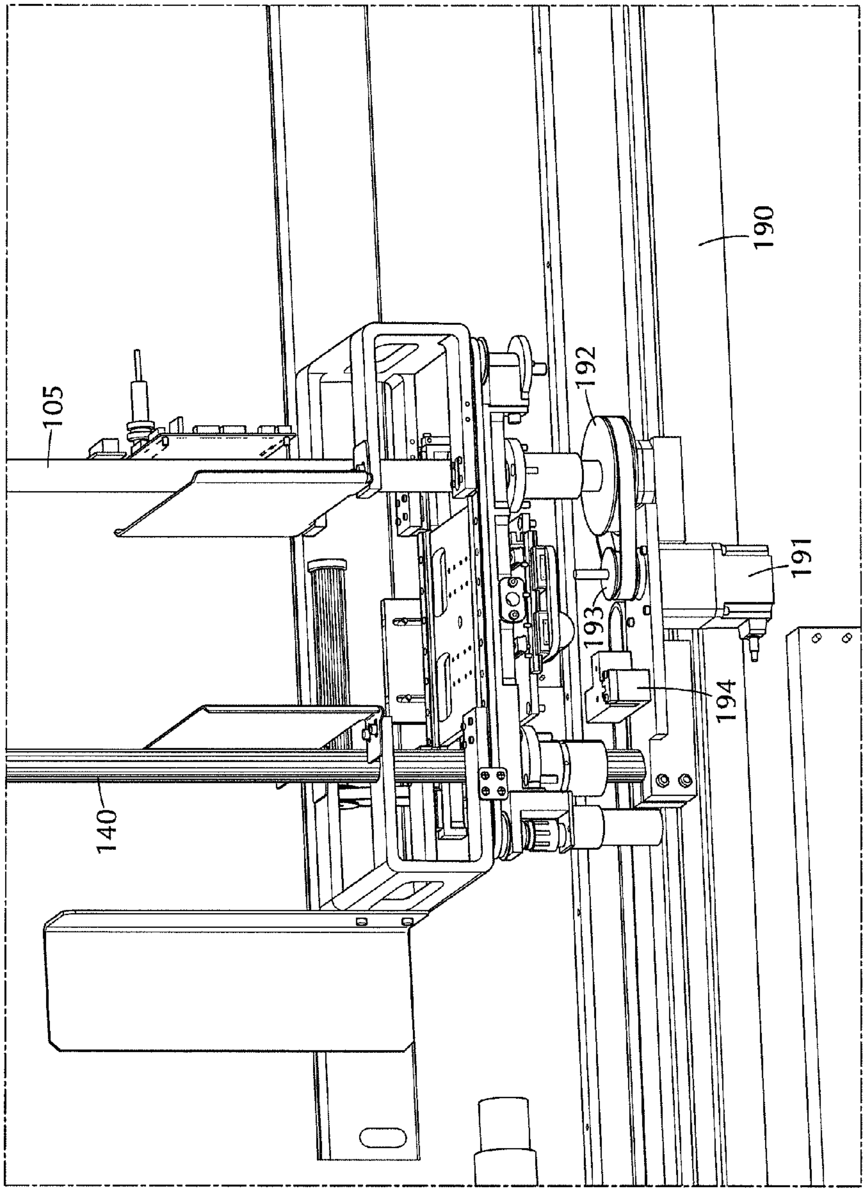
FIG. 4 shows the lifting portion FIG. 1, integrated into a rail movement system.

FIG. 4 shows the RPLA 100 situated on rail 190 using rail clamp 191. A driving pulley 192 and motor pulley 193 raises and lowers the robotic support bracket 102. The lead screw shaft 105 has screwing on it (not shown) and as it is rotated it will raise the robotic support bracket 102. A rotational encoder tracks the turns of the lead screw shaft 105. In this way the position of the RPLA 100 may be known based on the number of rotations in each direction. The vertical support 140 may have a hydraulic braking mechanism included to assist in braking and holding the RPLA 100 in place.

Figure 5:
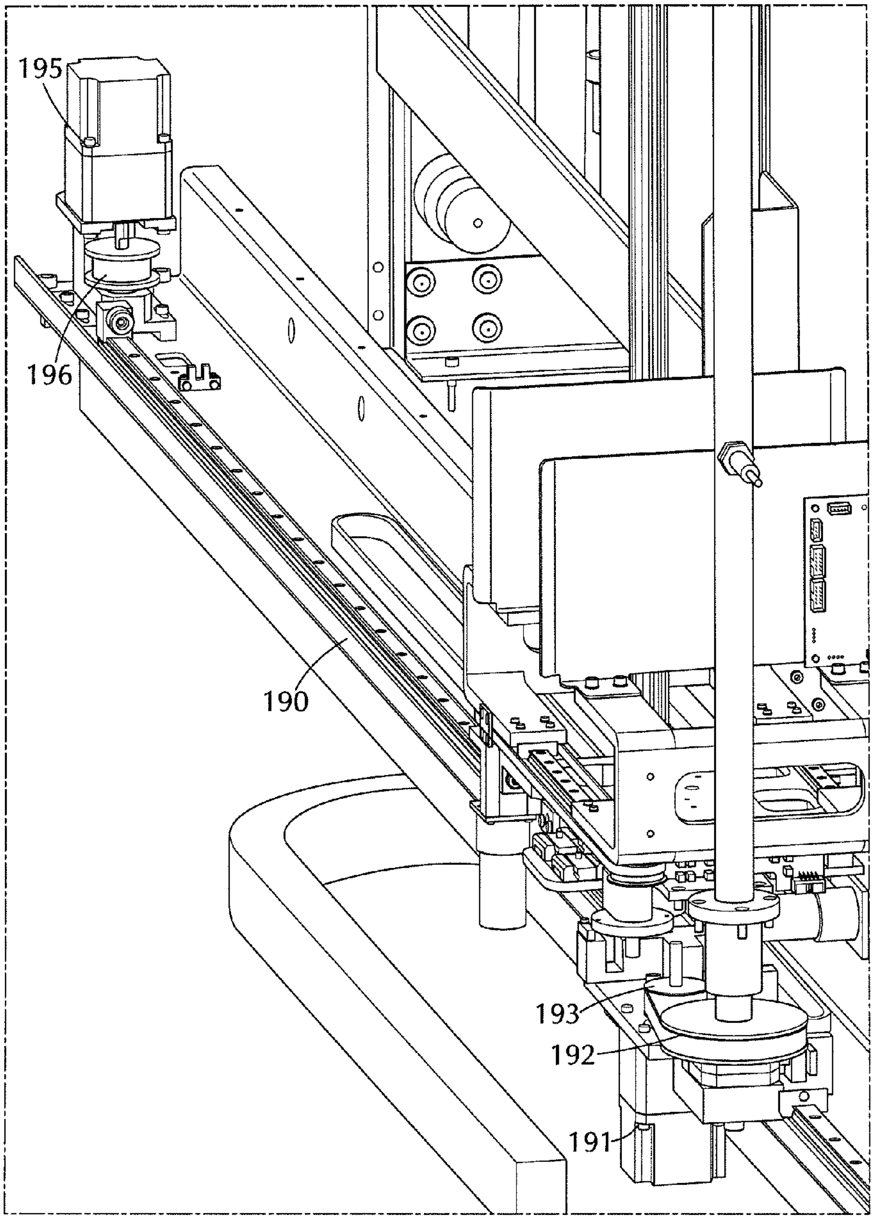
FIG. 5 shows the RPLA of FIG. 1, integrated into a rail movement system.

FIG. 5 shows RPLA 100 on rail 190. At either end of the rail 190 there may be a motor 195 and a driving pulley 196. The pulley 196 may include an encoder and/or a separate encoder may be located at the opposite end. Using this encoder, the position of the RPLA 100 may be tracked in relation to the slots for packages. This provides for the system to be driven between and along shelving or other slots in the X-axis direction.

Figure 6:
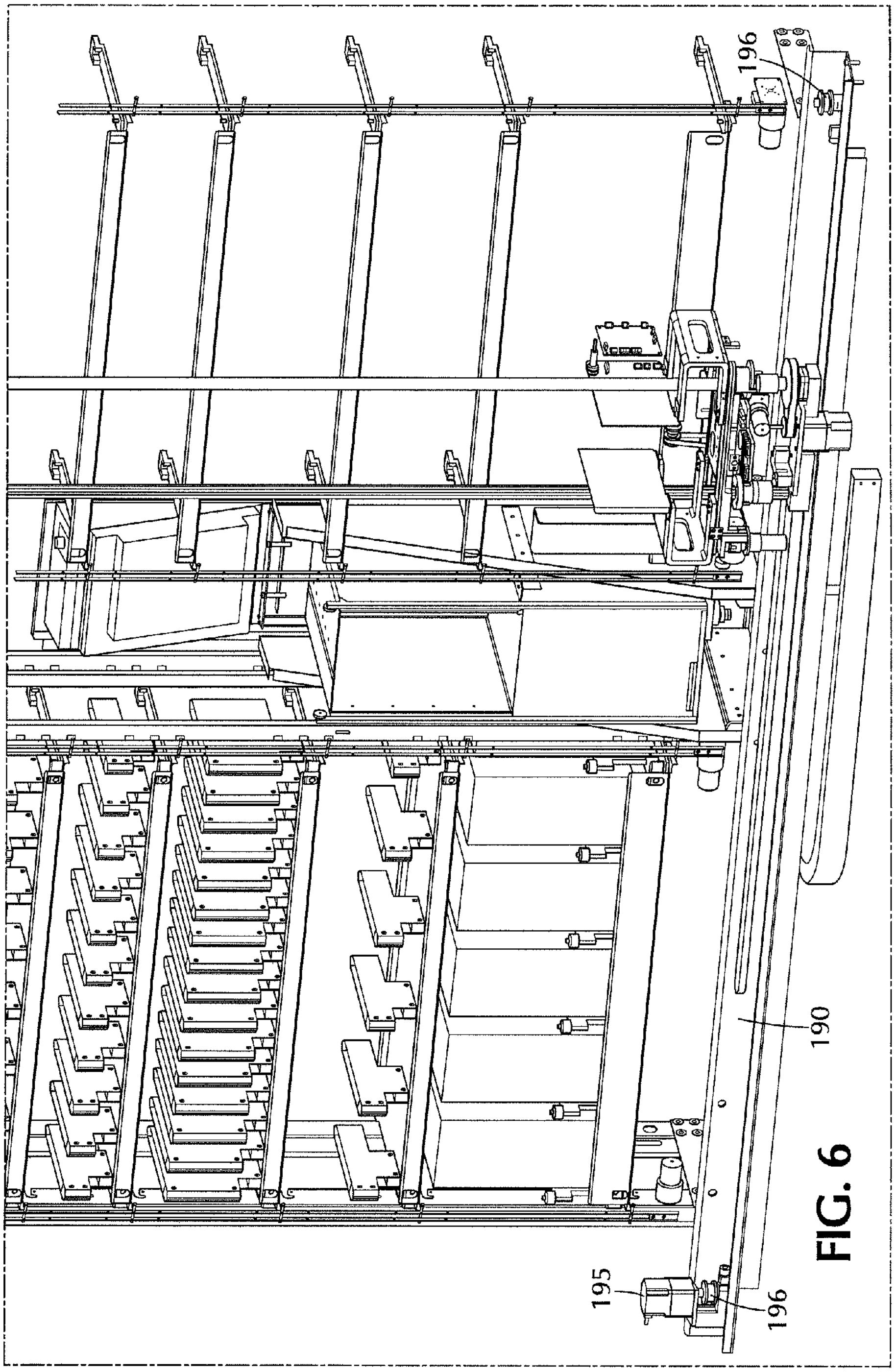
FIG. 6 shows another view of the RPLA of FIG. 1.

FIG. 6 shows a complete view of the RPLA 100. At either end of a rail 190 there may be a motor 195 and a driving pulley 196. In this view a shelving system can be seen in the background. The RPLA 100 is configured to have the position of the slots in the shelving or other storage area preprogrammed into the control system of the RPLA 100. The position of a package may be recorded in terms of the rotational movement of the encoders. Alternatively, the location may be coded by releasing the drive mechanism of the RPLA 100 and positioning the RPLA 100 at a slot. Then an indication can be sent to the control system that the RPLA 100 is at a slot and the slot location can be recorded.

With reference to FIGS. 1-6, the principles of operation of RPLA 100 include positional movement of the RPLA 100 in an X-Z plane. FIG. 6 shows an example of a plane that the RPLA 100 may move along. This process simplifies the movement and control of the RPLA 100. The grippers 130 move in a unified fashion for producing the initial movement of a package from a shelf and the conveyer belt 125 acts as the primary conveyer for a package. In operation, encoders record the position of a package when it is placed in a slot. The encoders record the position along the X and Z axis of the plane of travel of the RPLA 100. These encoders are rotational encoders and therefore are situated to count the rotations of a motor or pulley, such as motor 195 and driving pulley 196. This rotation is recorded by the computing system running the RPLA 100 and therefore linked to a position of a package.

The RPLA 100 includes a number of movement sub-systems. An x-axis movement subsystem moves the RPLA along the x-axis of the plane of movement. The x-axis movement subsystem may include a rail 190, a motor 195, and an encoder for sensing the movement of the RPLA. The RPLA may include a z-axis movement subsystem. The z-axis movement subsystem may include a vertically oriented rail, pole, or other support such as vertical support 140. Also included is a motor for driving the RPLA 100 up the vertically oriented support. This may, for example, be screw shaft or lead screw 105. An encoder tracks the position of the RPLA. The X and Z axis position provides for the position of a package or object as it is placed into shelving. The RPLA also includes a gripper subsystem. The gripper subsystem includes arms that move in perpendicular to the X-Z plane of movement. This may be, for example, grippers 130. A motor system accomplishes this movement. This may be, for example, motor 137. A second system provides for uniform gripping of the arms along the X axis. This may be, for example, gripper pulley 116 and clutch 115. The gripper subsystem may move in either direction in the positive Y or negative Y direction. In this way, the gripper subsystem may access shelving on either side of X-Z plane of travel.

Another subsystem includes a conveyer belt subsystem which may include conveyer belt 125. The belt 125 is oriented on the RPLA 100 and provides for the movement of an object on the belt 125 in the X axis direction. The belt subsystem functions in concert with the gripper subsystem to remove and accept packages or objects that are located at a particular X and Z axis position. The gripper subsystem extends to grab the package and pull it a sufficient distance so that the belt subsystem can move the package onto the RPLA 100. The RPLA 100 then may move to a new position and deposit the package by use of the belt subsystem.

The two above mentioned subsystems work together to grip and center the package or object. The gripper subassembly and the conveyor subassembly, have a side to side, frictionless or very low friction movement, on lift platform plate 112. This "float" distance matches the maximum clearance of a package to the width of the slot. Therefore a package that is off-centered can be gripped with even pressure from both arms as described herein. This left to right motion is locked in the center position by a motor and cam, such as for example, float motor Cam 175 and float motor sensor 176, or by a cylinder pair, while the machine moves to the desired slot. Upon arrival to the slot, the locking action is released. As the gripper bars 130 closes on a package that is not perfectly centered in the slot, the gripper assembly and receiving conveyor move either left or right as the gripper bars 130 engage. Once the package is retrieved, the lift platform plate 112 is re-centered, and the robot moves with the package to the center position of the next shelf for storage.

The RPLA 100 encodes the position of packages and slots by using the encoders. By counting the revolutions of a pulley or the vertically oriented support, the position of the RPLA 100 may be translated and recorded. Therefore, the precise positioning of a package may be known. During an initial setup, a memory portion of a circuit or processor controlling the RPLA 100 may be initialized or taught the positions of the position of slots. In one embodiment, the shelf positions are at standard preprogrammed heights and slots in the shelves at standard locations. In another embodiment, the motors of the RPLA 100 may be disengaged and the RPLA robotic support bracket portion may manually aligned with a slot and an indication may be sent to the circuit or processor controlling the RPLA 100.

The operation of the RPLA 100 may be implemented in a kiosk with shelving on either side of the kiosk. The kiosk includes a control mechanism for retrieving packages according to user commands. Since the RPLA 100 stores the position of certain packages it may automatically retrieve them in response to user commands. This can be utilized by entering into the system a particular code for a package which the RPLA 100 can then retrieve according to the recorded store position.

Figure 7:
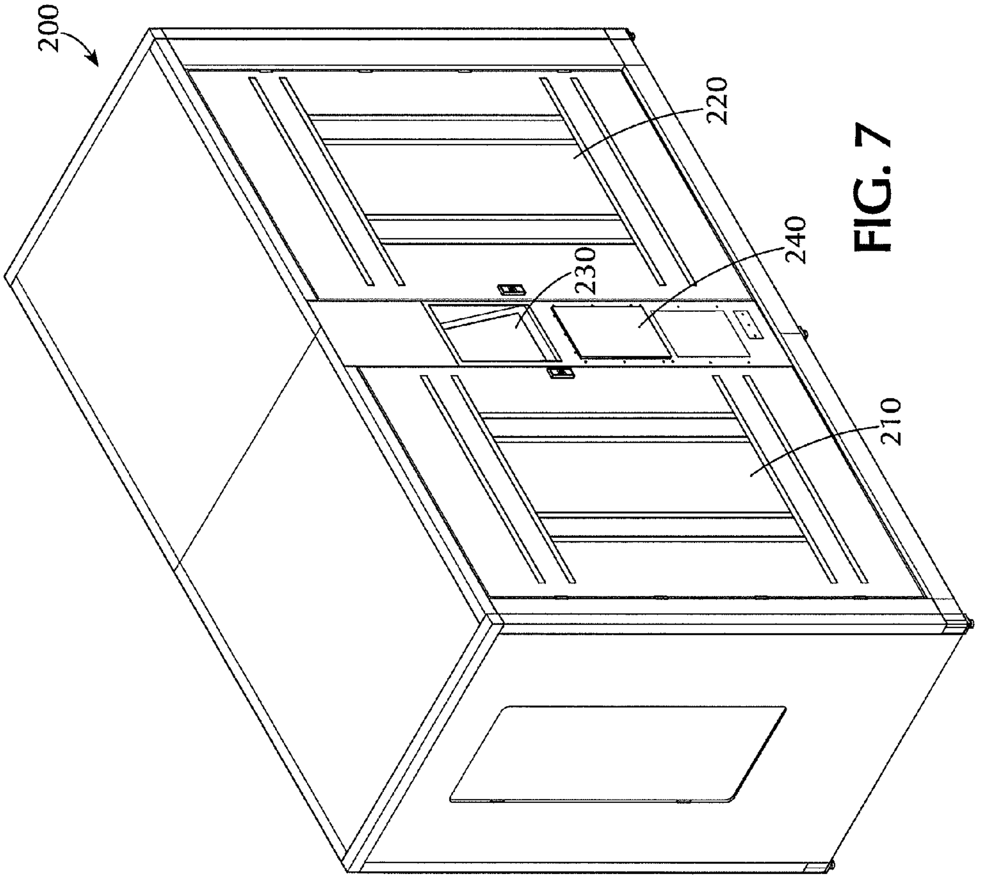
FIG. 7 shows a perspective view of one embodiment of a PDK.

FIG. 7 shows a perspective view of one embodiment of a kiosk 200 for distributing packages. Kiosk 200 is secure and surrounded by a number of panels. The kiosk 200 may be secured internally using a locking system controlled by a code accessible security system, and may be secured using an external lock, or any number of security means. The kiosk 200 may have, for example, two panels 210 and 220. However, the kiosk 200 may include any number of panels. A package distribution slot 240 is visible as is interface 230 A package distribution slot 240 in kiosk 200 provides for distribution of packages. An interface 230 may be a touch screen interface or may include a separate interface such as a keyboard or mouse. These kiosks are built to be secure by providing limited access to the kiosk through the usage of secured cabinet doors. These kiosks may be provided in a variety of locations including, stores, malls, post offices, apartment buildings, and any other areas that provide for significant public access. In the embodiment shown, a locking mechanism is shown in each panel 210 and 220. In alternative embodiments only one panel may have an externally accessible locking mechanism. The other panels may be releasable only via an external latch.

Figure 8:
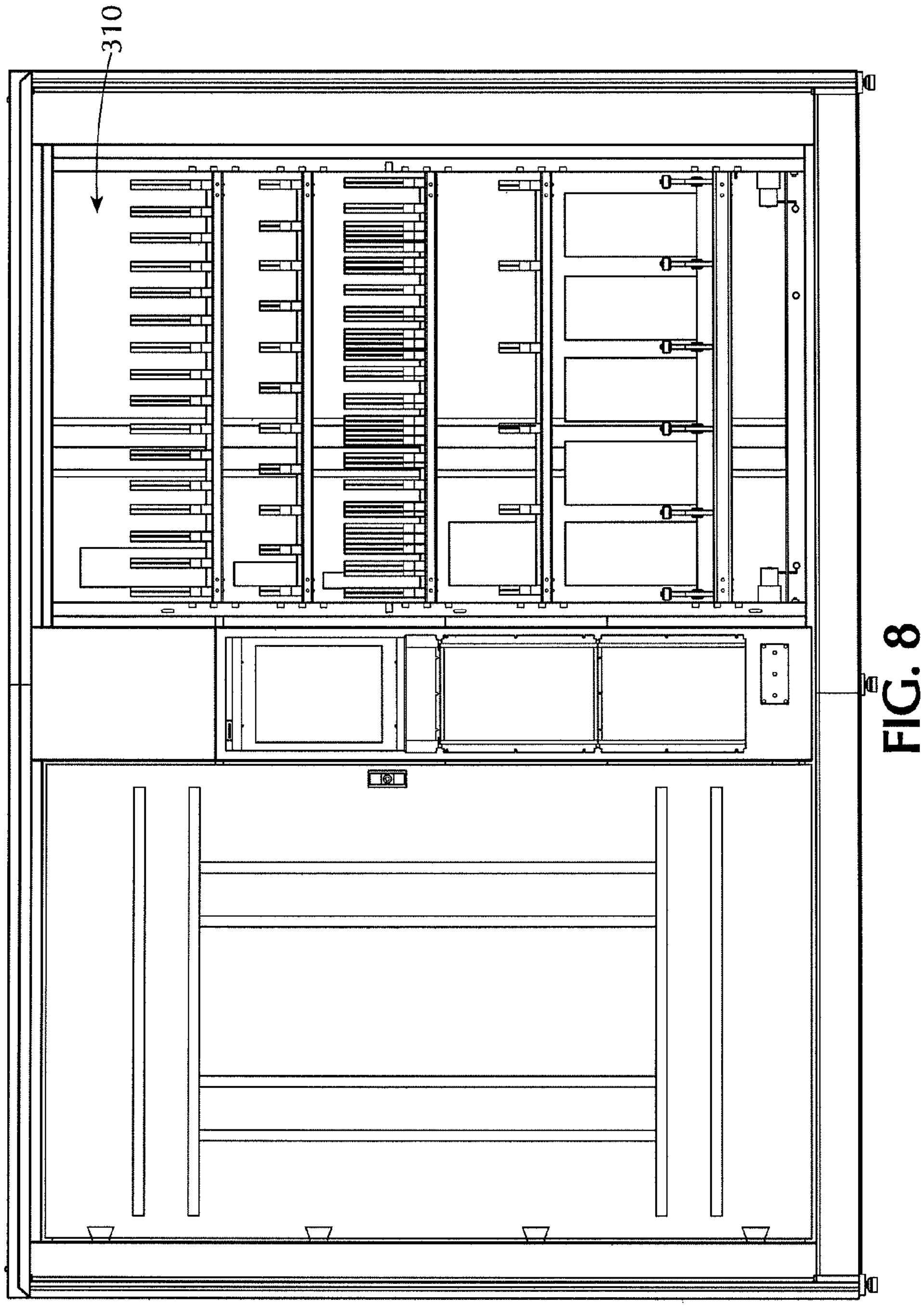
FIG. 8 shows the kiosk of FIG. 7 with a front panel removed.
Figure 9:
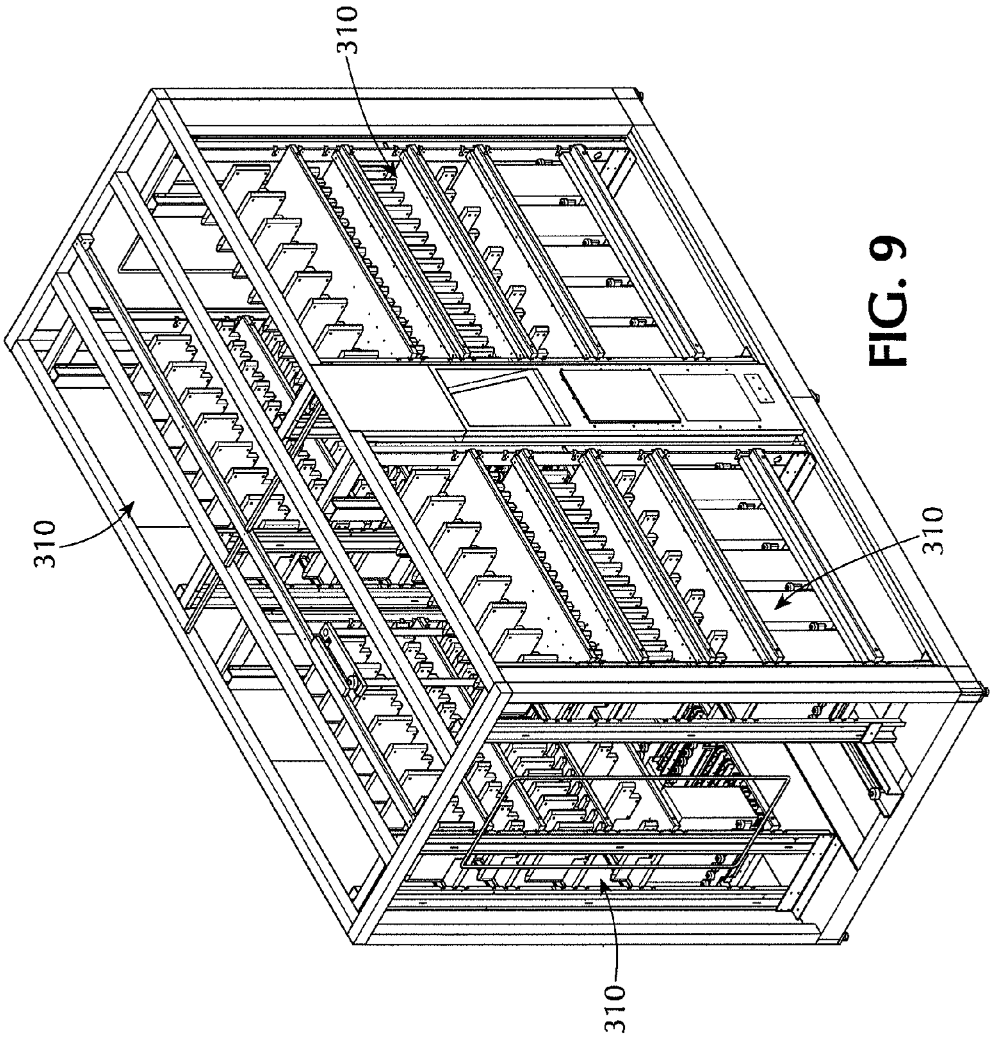
FIG. 9 shows the kiosk of FIG. 7 with the major panels removed.

FIGS. 8 and 9 show the interior of kiosk 200. In FIG. 8, panel 220 has been removed from kiosk 200. Inside the kiosk 200 there may be a shelving system 310. Various packages may be stored in the shelving system 310. In FIG. 9, panels 210 and 220 have been removed to show the interior of kiosk 200. Four sets of shelves 310 may be seen inside. These shelves 310 are specially adapted for storing packages of various sizes including, for example, standard package shipping sizes. The shelves 310 may be adapted to work with an interior robotic retrieval system or Robotic Package Lifting Assembly (RPLA).

Figure 10:
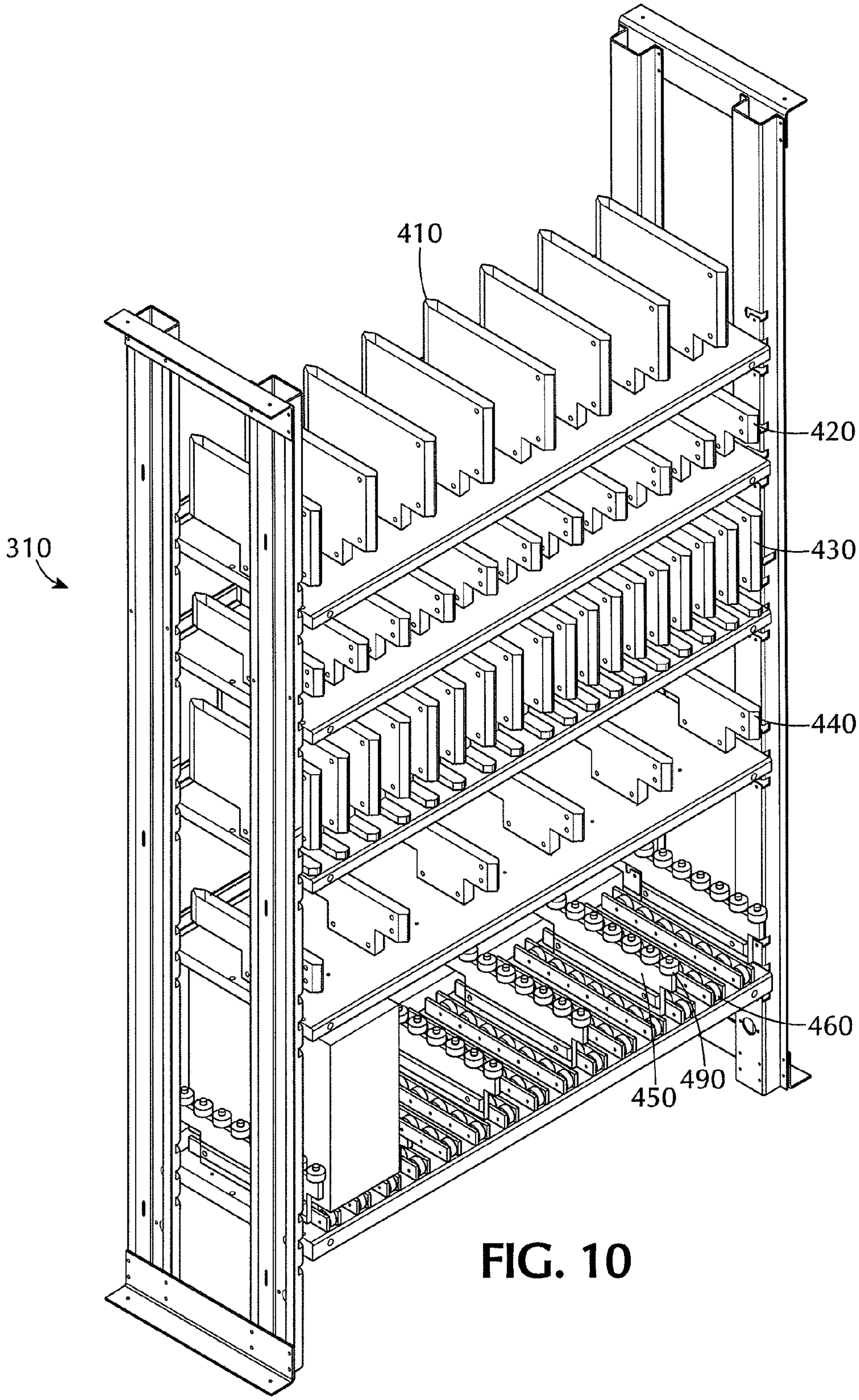
FIG. 10 shows one embodiment of a shelf for use in the kiosk system of FIG. 7.

FIG. 10 shows one embodiment of a shelf 310 for use with the kiosk 200. In general, the shelves 310 have a number of features that make them specially adapted for usage in kiosk 200. First they have a variety of heights that are configurable between the slots. These heights may be configured to accommodate standard mailing packages and the like. Second, the shelves 310 have a number of apertures for receiving dividers. Therefore, different shelves 310 may be easily configured for different width items. Third, the dividers themselves have specially designed shapes and configurations. They are specially designed to accommodate gripper arms from a robotic retrieval device. There are also dividers designed to accommodate certain types of packages, such as the envelopes that serve as standard overnight packages and special roller packages for heavier packages.

Referring to FIG. 10, the kiosk 200 may include dividers 410. These dividers 410 may be configured for the standard rate boxes that are used, for example, by post offices. The size of the box is generally in the 11"×8½"×5½" range. Dividers 420 are designed to accommodate lower profile boxes. The size of a box is generally in the 8⅝"×5⅜"×1⅝". Dividers 430 may be provided for envelopes that are specially designed to ensure that the envelopes remain as upright and square to all surfaces as possible to prevent jamming. These envelopes will generally be in the 12.5"×9.5" range. Dividers 440 may be provided for another sized box. The size of box is generally in the 13⅝"×11⅞"×3⅜". Dividers 450 with wheels 490 and accompanying rollers 460 may be provided for heavy boxes that may require reduced friction for removal. The size of box is generally in the Large 12"×12"×5½".

Figure 11:
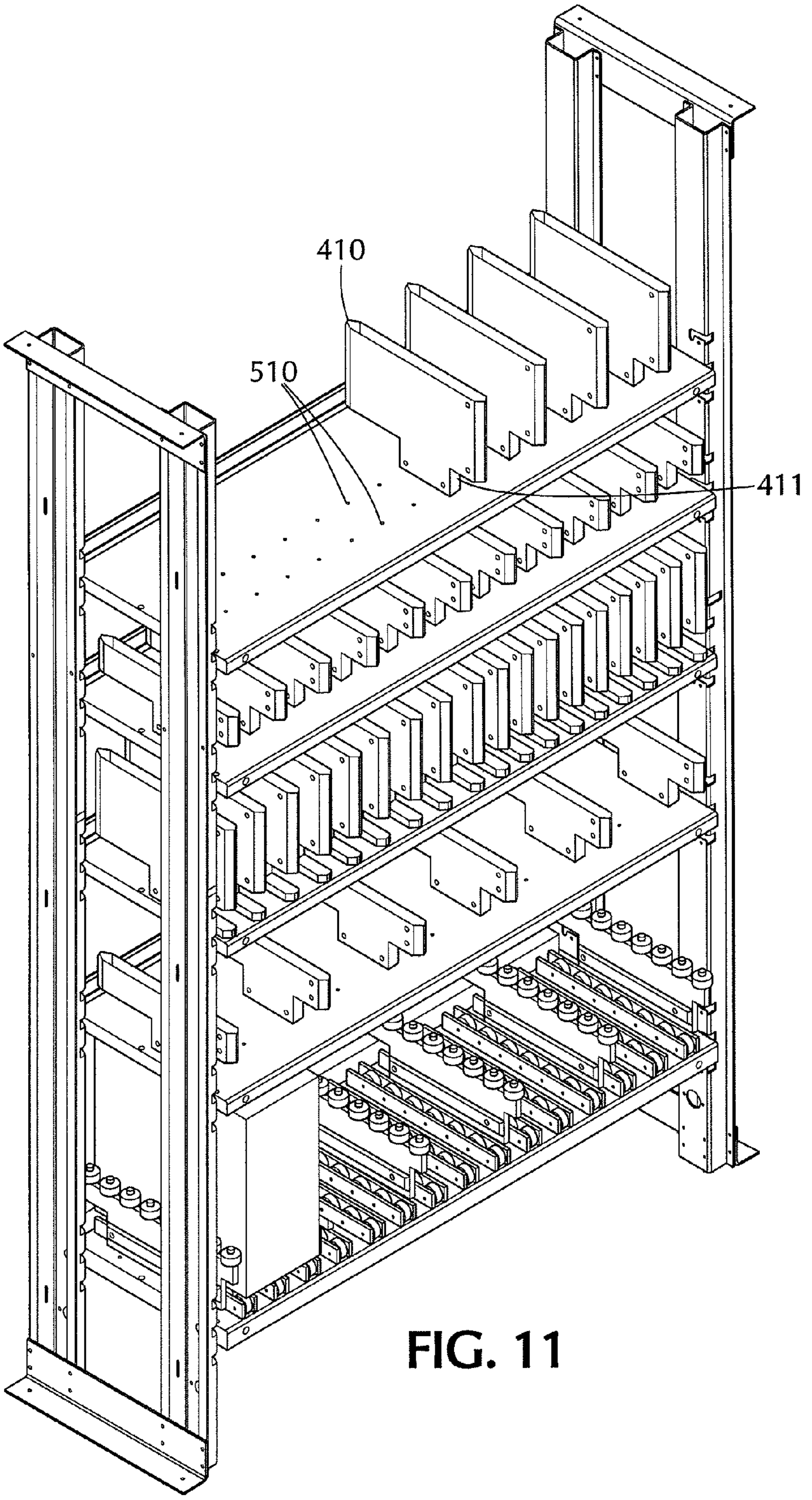
FIG. 11 shows a front view of the shelf of FIG. 10.

FIG. 11 shows shelving unit having a number of dividers 410 removed to reveal the spacing of apertures 510 for receiving the dividers 410. The apertures 510 shown on the left of the shelf are narrower than the mounted dividers, showing that various widths may be configured.

Figure 12:
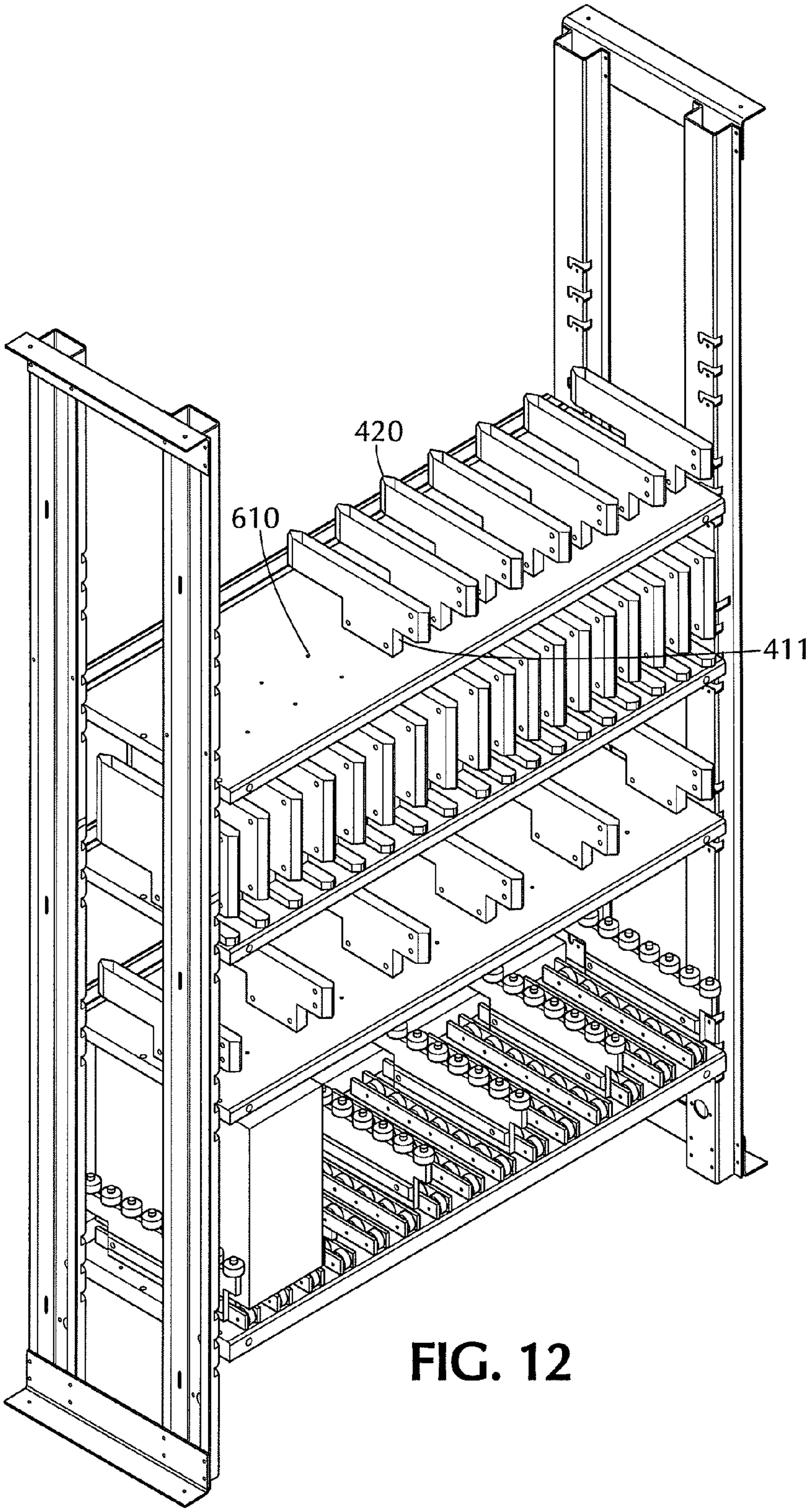
FIG. 12 shows the shelf of FIG. 10 with some of the dividers removed.
Figure 13:
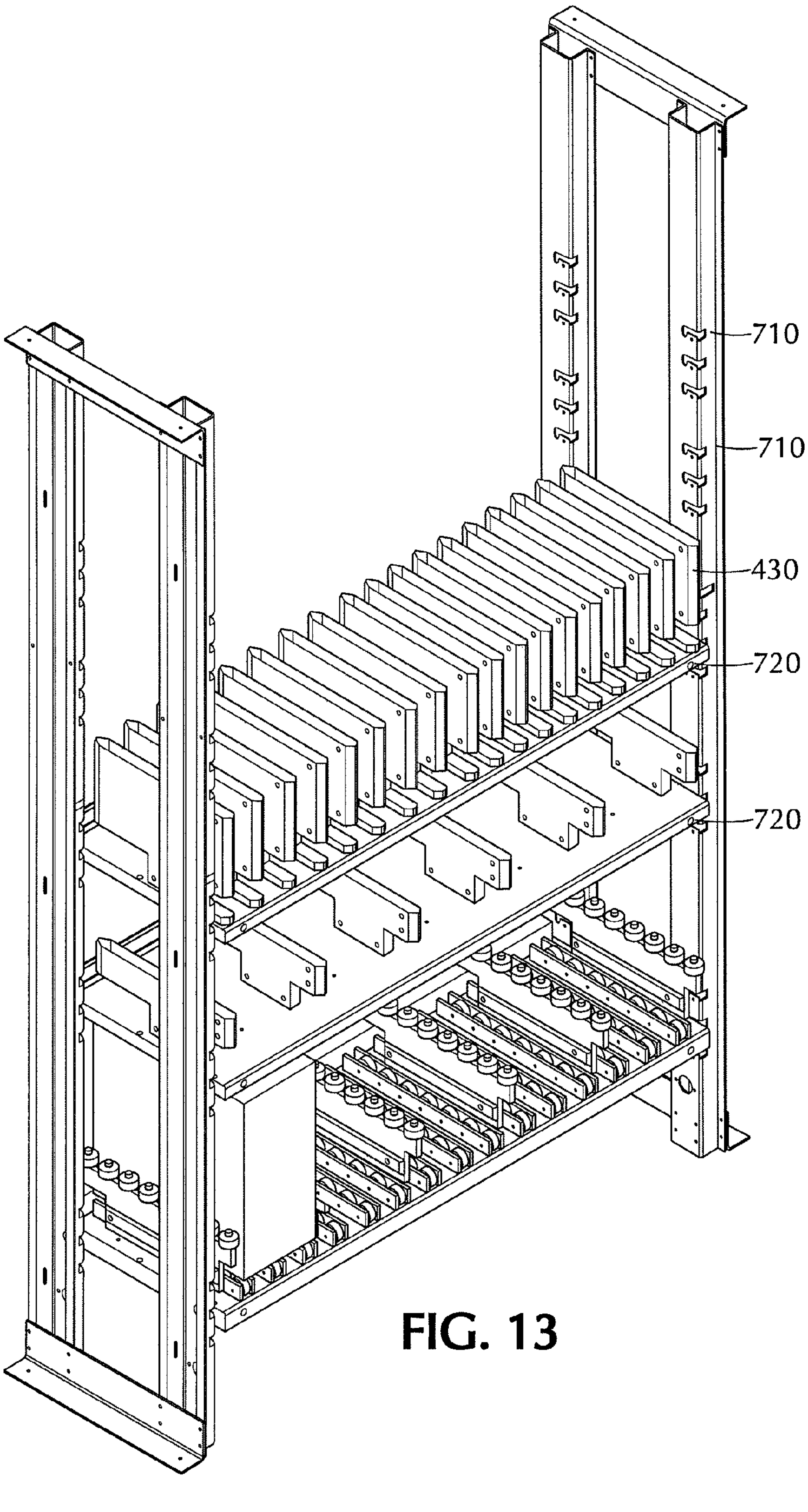
FIG. 13 shows the shelf of FIG. 10 with some of the dividers and shelves removed.

FIG. 12 shows a configuration of dividers 420 and apertures 610. Similar to that shown in FIG. 11, the dividers 420 may be substituted in and out and the height of the shelf may be configured as can the widths between the shelves. In particular, FIG. 13 shows multiple slots 710 for height configuration of the shelves 720, which may have dividers 430. Referring back to FIG. 12, the dividers 420 may have a cutout portion 411 that provides for the engagement of the gripper arms of a robotic package retrieval system.

Figure 14:
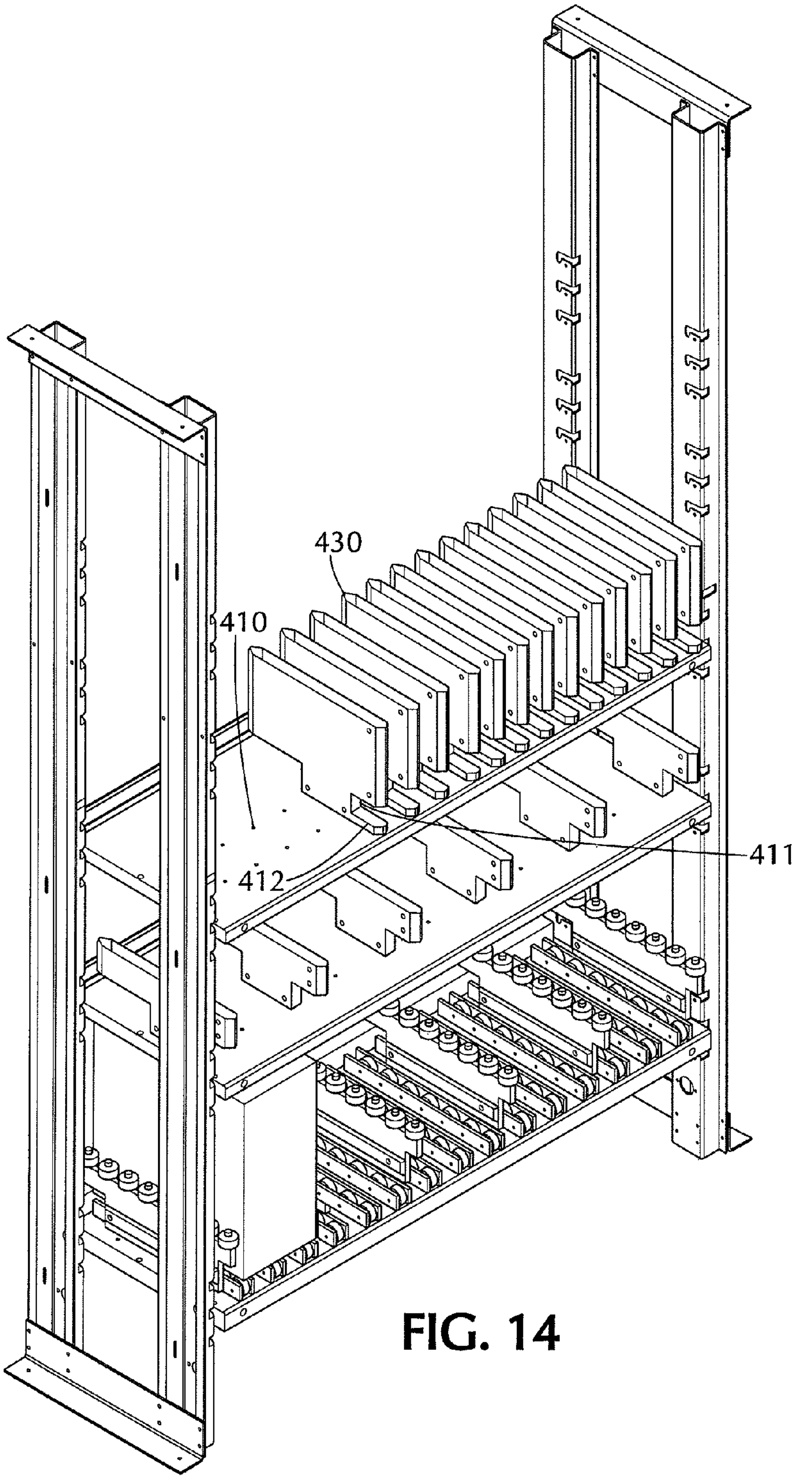
FIG. 14 shows the shelf of FIG. 7 with some of the dividers and shelves removed.

FIG. 14 shows a configuration of dividers 430 and apertures 410. This provides a better cross-sectional view of the cut-out portion 411 that provides for the engagement of the gripper arms of a robotic package retrieval system. These dividers 430 may also include a lower base portion 412 that extends under the cut-out portion 411. This extension of the base prevents an envelope positioned in the slot from becoming twisted and jammed. The corner of the envelope may become awkwardly positioned in the slot and jammed in the aperture or cut-out portion 411 that provides access to the robotic arms without this base portion. The bottom portion provides for a bottom surface that most of the edge of an envelope may rest against. This provides for keeping the envelope straight, in that the edge is parallel to the divider as it rests against it.

Figure 15:
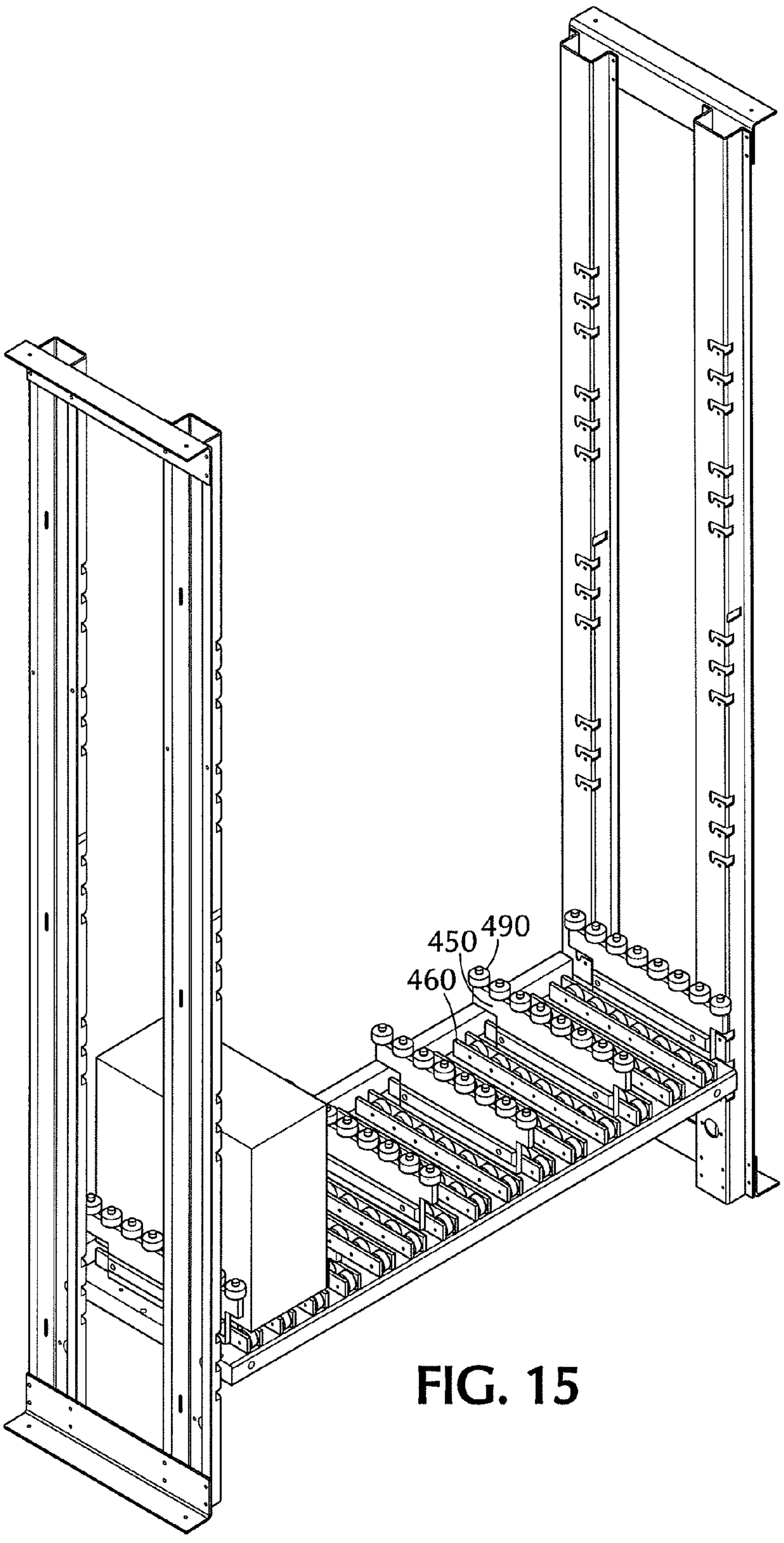
FIG. 15-16 shows a detailed view of the bottom shelf of FIG. 10.
Figure 16:
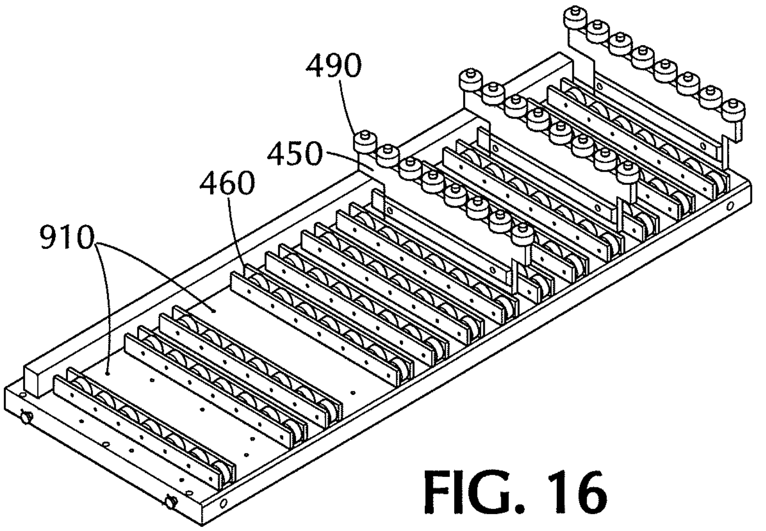

FIG. 15 shows a bottom shelf that is configured to receive larger and heavier packages. The roller bases 460 and the dividers 450 that include top mounted wheels 490 provide for reduced friction and easier sliding for boxes that include heavier loads. By mounting the wheels or rollers 490 on top of dividers 450 as opposed to on their sides a space savings is achieved since only a single wheel is mounted as opposed to having two wheels mounted when in a side configuration. FIG. 16 shows a shelf removed from the shelving system that shows rollers 460 and 490 and where some roller bases 460 and wheels 490 have been removed to reveal apertures 910 in which the dividers 450 and the rollers 460 fit. The shelf itself may be the same as the other shelves as the apertures may be configured to fit the variety of dividers and rollers.

Figure 17:
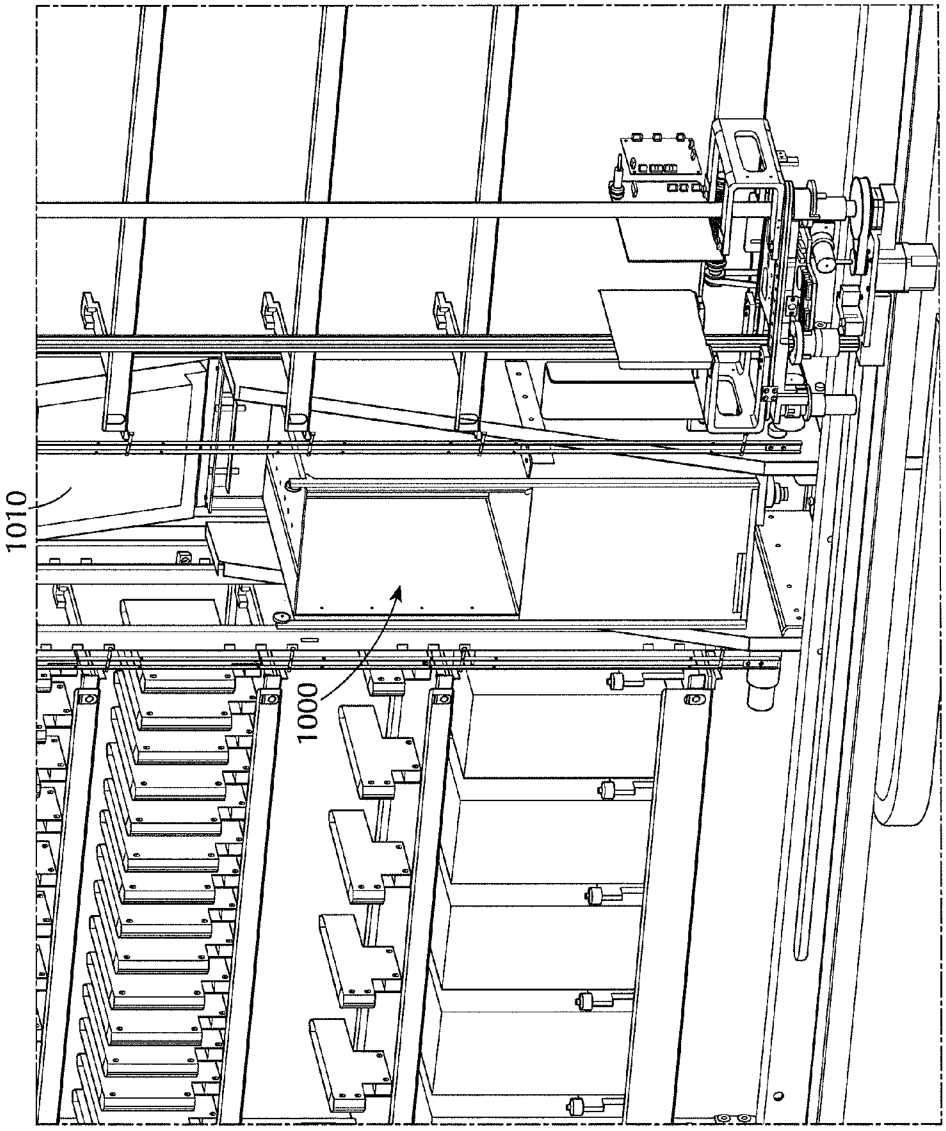
FIG. 17 shows an interior shot of the kiosk showing the delivery slot and RPLA.

FIG. 17 shows the interior of a kiosk system including package slots 1000 through which a package may be delivered to a user. This slot 1000 and the accompanying interface 1010 are located between a set of shelves. The shelves are located along a track for a picker robot that may retrieve packages and deliver them to the slot 1000. Shelves may be located on either side of the picker robot track.

Referring further to the aperture for providing access to the robotic arms, this aperture provides for space savings in the shelving system. Additional space would be needed between the slots without these apertures. Each one of the dividers in the embodiment shown has such an aperture.

In one embodiment, the PDK includes a Robotic Package Lifting Assembly (RPLA) and integrated kiosk with shelving system. The RPLA is configured to remember the location of packages and slots and provide for automated retrieval and placement of the packages.

The systems of the PDK and RPLA are optimized to work together and have innovations and enhancements that allow them to work together. Specifically, grabber 130 interfaces with the shelving system at cutout portions 411. This provides for the dividers of the shelves to be more closely situated since the grabbers need not navigate a narrow space between the shelves and the package contained therein. Furthermore, the shelving system and kiosk is designed to run along the rail that the RPLA moves on. A greater number of packages may therefore be stored per unit area, due to the shelving system and associated cutouts and the reduced number of access points needed. In one embodiment, the PDK includes a Robotic Package Lifting Assembly (RPLA) and integrated kiosk with shelving system. The RPLA is configured to remember the location of packages and slots and provide for automated retrieval and placement of the packages. The shelving system is specially adapted to receive the RPLA gripper arms and the kiosk has shelving positioned to accommodate the unique movement of the RPLA.

In general, a kiosk system for storing and distributing packages includes a kiosk body, and the kiosk body has a package delivery slot and an interface slot. The system further includes a first and second shelving system in the kiosk body. The first and second shelving system is located on either side of the package delivery slot. For each shelf, the shelving system each includes a plurality of shelves having a plurality of receiving apertures. A plurality of dividers is configured to fit into the plurality of receiving apertures, where each of the plurality of dividers has a receiving slot.

The kiosk system further includes a package retrieving apparatus including a track, and a base slidably interconnected with the track. The package retrieving apparatus includes a vertical support interconnected with the base and a package picker module. The package picker module is oriented on the vertical support such that the package picker module may move up and down the vertical support.

The package picker module includes a first and second gripper and a conveyer belt, the conveyer belt oriented in a plane parallel to the ground and the first and second gripper oriented parallel to the conveyer belt. The first and second gripper is configured to move parallel to the conveyer belt, surround an object and grip the object beyond the surface of the conveyer belt.

The receiving slot is configured to allow for the first and second gripper to grab the object located in a first slot between a first divider and a second divider of the plurality of dividers. Optionally, the package retrieving apparatus is configured to receive commands from an interface located in the interface slot and retrieve packages in the shelving system. Optionally, the receiving slot is a rectangular cut-out in a corner of each of the plurality of dividers. In one alternative, the plurality of dividers includes a first plurality of dividers of a first height and a second plurality of dividers of a second height, the first plurality of dividers of a first height are configured to provide a first height slot and second plurality of dividers of a second height is configured to provide a second height slot.

In one configuration, the plurality of dividers includes a third plurality of dividers, each of the third plurality of dividers further including a base portion, the base portion running along a bottom portion of each of the third plurality of dividers, the bottom portion being the portion that interfaces with the plurality of shelves, the base portion having a first thickness, that is thicker than a second thickness of the plurality of dividers, the base portion having a low profile compared to the size of the receiving slot, the base portion providing a narrower opening such that the edge of a thin rectangular object stands in an alignment closer to perpendicular to the plurality of shelves as compared to without the base portion. In another configuration, the plurality of dividers includes a fourth plurality of dividers and a plurality of rollers is attached to the fourth plurality of dividers.

Optionally, the gripping of the first and second gripper is driven by a pulley system that configures each of the first and second grippers to move in unison and at the same rate, such that the package is centered during the gripping.

In one alternative, the package retrieving apparatus further includes a first and second encoder. The first and second encoder are integrated into the package retrieving apparatus such that they provide an X and Z position. Optionally, the first encoder is oriented in a X-position pulley mechanism, the X-position pulley mechanism includes a first motor and a first belt, the first belt running along the track and interconnected with the base and the second encoder is oriented in a Z-position pulley mechanism, the Z-position pulley mechanism includes a second motor and a third belt, the Z-position pulley mechanism configured to rotate the vertical support and the second encoder providing for the raising and lowering of the base and record a second position of the base. In one configuration, the first and second encoder sense rotational movement and the first encoder provides a first rotational movement signal to a control system and the second encoder providing a second rotational movement signal to the control system and the control system stores a position of the object, the position being a record of the first and second rotational movement signal.

In another configuration, the package picker module is configured to extend the first and second gripper in an Y-axis direction, grip the object by moving the first and second gripper closer together, pull the object to the conveyer belt, the conveyer belt rotating in the Y-Axis direction, the conveyer belt conveying the object to a resting point on the conveyer belt. Optionally, the vertical support has a screw shaped outer surface and the turning of the vertical support provides for the raising and lowering of the base and the package retrieving apparatus further including a secondary vertical support and a braking mechanism located on the base configured to provide braking of the secondary vertical support. Alternatively, the control system includes preprogrammed positions for slots to receive the object and the control system is configured to record the position of the object in a one of the slots after placing the object.

In another embodiment, a kiosk system for storing and distributing packages includes a kiosk body having a package delivery slot and an interface slot. The system further includes a first shelving system in the kiosk body, the first shelving system each including a plurality of shelves, the plurality of shelves parallel to the ground, the plurality of shelves also having a plurality of receiving apertures; a plurality of dividers, the dividers configured to fit into the plurality of receiving apertures, each of the plurality of dividers having a receiving slot.

The system further includes a package retrieving apparatus including a track, a base slidably interconnected with the track; a vertical support interconnected with the base; a package picker module, the package picker module oriented on the vertical support, such that the package picker module may move up and down the vertical support. The package picker module includes a first and second gripper. The first and second gripper is configured to move parallel to the plurality of shelves to surround an object and grip the object and the receiving slot is configured to allow for the first and second gripper to grab the object located in a first slot between a first divider and a second divider of the plurality of dividers.

Optionally, the plurality of dividers includes a third plurality of dividers, each of the third plurality of dividers further including a base portion, the base portion running along a bottom portion of each of the third plurality of dividers, the bottom portion being the portion that interfaces with the plurality of shelves, the base portion having a first thickness, the first thickness being thicker than a second thickness of the plurality of dividers, the base portion having a low profile compared to the size of the receiving slot, the base portion providing a more narrow opening such that the edge of a thin rectangular object stands in an alignment closer to perpendicular to the plurality of shelves as compared to without the base portion.

In one option, the plurality of dividers includes a fourth plurality of dividers and a plurality of rollers is attached to the fourth plurality of dividers. In another option, the gripping of the first and second grippers is driven by a pulley system that configures each of the first and second grippers to move in unison and at the same rate, such that the package is centered during the gripping. Alternatively, the package retrieving apparatus further includes a first and second encoder, the first and second encoder integrated into the package retrieving apparatus such that they provide an X and Z position.

Optionally, the first encoder is oriented in a X-position pulley mechanism, the X-position pulley mechanism includes a first motor and a first belt, the first belt running along the track and interconnected with the base and the second encoder is oriented in a Z-position pulley mechanism, the Z-position pulley mechanism includes a second motor and a second belt, the Z-position pulley mechanism configured to rotate the vertical support and the second encoder providing for the raising and lowering of the base and record a second position of the base. Optionally, the first and second encoder sense rotational movement and the first encoder providing a first rotational movement signal to a control system and the second encoder providing a second rotational movement signal to the control system and the control system stores a position of the object, the position being a record of the first and second rotational movement signals.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein, but is intended to cover modifications within the spirit and scope thereof as defined by the appended claims and any and all equivalents thereof. Note that, although particular embodiments are shown, features of each attachment may be interchanged between embodiments.

What is claimed is:

1. A kiosk system for storing and distributing packages, the system comprising:

- a kiosk body, the kiosk body having a package delivery slot and an interface slot,
- a first and second shelving system in the kiosk body, the first and second shelving system located on either side of the package delivery slot, the first and second shelving system each including a plurality of shelves, the plurality of shelves having a plurality of receiving apertures;
- a plurality of dividers configured to fit into the plurality of receiving apertures, each of the plurality of dividers having a receiving slot; and
- a package retrieving apparatus comprising:
  - a track;
  - a base slidably interconnected with the track;
  - a vertical support, interconnected with the base;
  - a package picker module oriented on the vertical support to vertically move on the vertical support, wherein the package picker module includes a first and second gripper and a conveyer belt, the conveyer belt oriented in a plane parallel to the ground and the first and second gripper oriented parallel to the conveyer belt, the first and second gripper configured to move parallel to the conveyer belt to surround an object and grip the object beyond the surface of the conveyer belt, wherein the receiving slot is configured to allow for the first and second gripper to grab the object located in a slot between a pair of dividers of the plurality of dividers.

2. The kiosk system of claim 1, wherein the package retrieving apparatus is configured to receive commands from an interface located in the interface slot and retrieve packages in the shelving system.

3. The kiosk system of claim 2, wherein the receiving slot is a rectangular cut-out in a corner of each of the plurality of dividers.

4. The kiosk system of claim 3, wherein the plurality of dividers includes a first plurality of dividers of a first height and a second plurality of dividers of a second height, the first plurality of dividers of a first height are configured to provide a first height slot and second plurality of dividers of a second height is configured to provide a second height slot.

5. The kiosk system of claim 4, wherein the plurality of dividers includes a third plurality of dividers, each of the third plurality of dividers further including a base portion, the base portion running along a bottom portion of each of the third plurality of dividers, the bottom portion being the portion that interfaces with the plurality of shelves, the base portion having a first thickness, the first thickness thicker than a second thickness of the plurality of dividers, the base portion having a low profile compared to the size of the receiving slot, the base portion providing a narrower opening such that the edge of a thin rectangular object stands in an alignment closer to perpendicular to the plurality of shelves as compared to without the base portion.

6. The kiosk system of claim 5, wherein the plurality of dividers includes a fourth plurality of dividers and a plurality of rollers attached is attached to the fourth plurality of dividers.

7. The kiosk system of claim 6, wherein the gripping of the first and second gripper are driven by a pulley system that configures each of the first and second gripper to move in unison and at the same rate, such that the package is centered during the gripping.

8. The kiosk system of claim 7, the package retrieving apparatus further comprising:
- a first and second encoder, the first and second encoder integrated into the package retrieving apparatus such that they provide an X and Z position.

9. The kiosk system of claim 8, wherein the first encoder is oriented in a X-position pulley mechanism, the X-position pulley mechanism includes a first motor and a first belt, the second belt running along the track and interconnected with the base and the second encoder is oriented in a Z-position pulley mechanism, the Z-position pulley mechanism includes a second motor and a second belt, the Z-position pulley mechanism configured to rotate the vertical support and the second encoder providing for the raising and lowering of the base and record a second position of the base.

10. The kiosk system of claim 9, wherein the first and second encoder sense rotational movement, wherein the first encoder provides a first rotational movement signal to a control system and the second encoder provides a second rotational movement signal to the control system and the control system stores a position of the object, the position being a record of the first and second rotational movement signals.

11. The kiosk system of claim 10, wherein the package picker module is configured to extend the first and second gripper in an Y-axis direction, grip the object by moving the first and second gripper closer together, pull the object to the conveyer belt, the conveyer belt rotating in the Y-Axis direction, the conveyer belt conveying the object to a resting point on the conveyer belt.

12. The kiosk system of claim 11, wherein the vertical support has a screw shaped outer surface and the turning of the vertical support provides for the raising and lowering of the base and the package retrieving apparatus further including a secondary vertical support and a braking mechanism located on the base configured to provide braking of the secondary vertical support.

13. The kiosk system of claim 12, wherein the control system includes preprogrammed positions for slots to receive the object, wherein the control system is configured to record the position of the object in a one of the slots after placing the object.

14. A kiosk system for storing and distributing packages, the system comprising:
- a kiosk body, the kiosk body having a package delivery slot and an interface slot;
- a shelving system in the kiosk body, the shelving system including a plurality of shelves, the plurality of shelves having a plurality of receiving apertures;
- a plurality of dividers configured to fit into the plurality of receiving apertures, each of the plurality of dividers having a receiving slot;
- a package retrieving apparatus comprising:
  - a track;
  - a base slidably interconnected with the track;
  - a vertical support, interconnected with the base;
  - a package picker module oriented on the vertical support such that the package picker module may move up and down the vertical support, wherein the package picker module includes a first and second gripper, wherein the first and second gripper is configured to move parallel to the plurality of shelves to surround an object and grip the object, wherein the receiving slot is configured to allow for the first and second gripper to grab the object located in a first slot between a first divider and a second divider of the plurality of dividers.

15. The kiosk system of claim 14, wherein the plurality of dividers includes a third plurality of dividers, each of the third plurality of dividers further including a base portion, the base portion running along a bottom portion of each of the third plurality of dividers, the bottom portion being the portion that interfaces with the plurality of shelves, the base portion having a first thickness, the first thickness thicker than a second thickness of the plurality of dividers, the base portion having a low profile compared to the size of the receiving slot, the base portion providing a narrower opening such that the edge of a thin rectangular object stands in an alignment closer to perpendicular to the plurality of shelves as compared to without the base portion.

16. The kiosk system of claim 15, wherein the plurality of dividers includes a fourth plurality of dividers and a plurality of rollers attached is attached to the fourth plurality of dividers.

17. The kiosk system of claim 16, wherein the gripping of the first and second gripper are driven by a pulley system that configures each of the first and second gripper to move in unison and at the same rate, such that the package is centered during the gripping.

18. The kiosk system of claim 17, the package retrieving apparatus further comprising:
- a first and second encoder, the first and second encoder integrated into the package retrieving apparatus such that they provide an X and Z position.

19. The kiosk system of claim 18, wherein the first encoder is oriented in a X-position pulley mechanism, the X-position pulley mechanism includes a first motor and a first belt, the first belt running along the track and interconnected with the base and the second encoder is oriented in a Z-position pulley mechanism, the Z-position pulley mechanism includes a second motor and a second belt, the Z-position pulley mechanism configured to rotate the vertical support and the second encoder providing for the raising and lowering of the base and record a second position of the base.

20. The kiosk system of claim 19, wherein the first and second encoder sense rotational movement, wherein the first encoder provides a first rotational movement signal to a control system and the second encoder provides a second rotational movement signal to the control system and the control system stores a position of the object, the position being a record of the first and second rotational movement signals.

* * * * *